United States Patent
Powell, Jr.

(10) Patent No.: US 6,179,129 B1
(45) Date of Patent: Jan. 30, 2001

(54) COLOR SORTER ASSEMBLY AND METHOD

(75) Inventor: Harry C. Powell, Jr., Faber, VA (US)

(73) Assignee: Powell Machinery, Inc., Faber, VA (US)

(*) Notice: Under 35 U.S.C. 154(b), the term of this patent shall be extended for 0 days.

(21) Appl. No.: 09/235,275

(22) Filed: Jan. 22, 1999

(51) Int. Cl.$^7$ .................................................. B07C 5/342
(52) U.S. Cl. .......................... 209/912; 209/538; 209/919; 209/592; 209/576; 209/580; 209/934; 209/698; 209/701; 198/387; 177/145
(58) Field of Search .................................. 209/912, 538, 209/919, 593, 592, 576, 577, 580, 581, 587, 938, 596, 934, 698, 701; 198/387, 370.04, 370.02, 370.01, 779; 177/145

(56) References Cited

U.S. PATENT DOCUMENTS

| | | | |
|---|---|---|---|
| 2,296,645 | * | 9/1942 | Marsden .................................. 198/33 |
| 2,853,108 | * | 9/1958 | Hait ......................................... 146/73 |
| 3,013,661 | * | 12/1961 | Strubhar ............................. 209/111.5 |
| 4,106,628 | * | 8/1978 | Warkentin et al. ..................... 209/74 |
| 4,726,898 | * | 2/1988 | Mills et al. ............................ 209/545 |
| 4,730,719 | * | 3/1988 | Brown et al. .......................... 198/387 |
| 4,957,619 | * | 9/1990 | Powell, Jr. ............................ 209/539 |
| 4,981,205 | * | 1/1991 | Cowlin .................................. 198/387 |
| 5,042,637 | * | 8/1991 | La Vars et al. ....................... 198/372 |
| 5,044,504 | * | 9/1991 | Powell, Jr. ............................ 209/539 |
| 5,078,258 | * | 1/1992 | Van Der Schoot ................... 198/384 |
| 5,101,982 | | 4/1992 | Gentili . |
| 5,174,429 | * | 12/1992 | La Vars et al. ....................... 198/372 |
| 5,183,151 | | 2/1993 | Powell, Jr. . |
| 5,195,628 | * | 3/1993 | Warkentin ............................. 198/370 |
| 5,215,179 | * | 6/1993 | Warkentin ............................. 198/365 |
| 5,230,394 | * | 7/1993 | Blanc .................................... 177/145 |
| 5,244,100 | * | 9/1993 | Regier et al. ......................... 209/556 |
| 5,267,654 | | 12/1993 | Leverett . |
| 5,294,004 | | 3/1994 | Leverett . |
| 5,431,273 | * | 7/1995 | Affeldt et al. ................... 198/370.04 |
| 5,497,887 | * | 3/1996 | Hiebert .................................. 209/538 |
| 5,544,731 | * | 8/1996 | Ross et al. ............................ 198/387 |
| 5,611,419 | * | 3/1997 | La Vars ............................ 198/370.04 |
| 5,626,236 | * | 5/1997 | Hiebert .................................. 209/538 |
| 5,677,516 | * | 10/1997 | Leverett ................................. 177/52 |

FOREIGN PATENT DOCUMENTS

| | | |
|---|---|---|
| 11059876 | * 3/1999 | (JP) . |
| WO 91/04803 | 4/1991 | (WO) . |

OTHER PUBLICATIONS

Four page Unisorter brochure, admitted prior art.
Four page Versasort brochure, Durand Wayland, Feb. 1998.
Two page Grader brochure, admitted prior art.
Two page CVS Colour Sizer brochure, admitted prior art.
Two page Piano Key Sizer brochure, admitted prior art.
Six page Blemish Grader brochure, admitted prior art.

* cited by examiner

Primary Examiner—Donald P. Walsh
Assistant Examiner—David Jones
(74) Attorney, Agent, or Firm—Nixon & Vanderhye P.C.

(57) ABSTRACT

An article transporting, and preferably also color and/or weight sorting, assembly and method, support the articles (.g. apples or like pieces of fruit), and effect precise rotation (e.g. within about 5°) of all apples transported thereby. This allows accurate determination of the apple's color by color sensing equipment (e.g. a color camera). The assembly comprises a support element, and two sets of cones mounted to the support by rotatable shafts, each set comprising first and second cones having a tapered exterior surface, the cones on each shaft facing each other and tapering to an imaginary substantially common midpoint. The cones support an apple essentially without the apple engaging the shaft. The cones may be of soft yieldable plastic or rubber with a first taper of about 25–35° (e.g. about 28°), and optionally one or more steps of different taper. The shafts are positively rotated substantially in unison by a gear mounted to the end of each shaft and engaging a stationary gear rack, so that for each 360° revolution of a shaft an apple supported by the cones rotates substantially 120°. The rack is designed to have only half or less the life of the gears.

21 Claims, 5 Drawing Sheets

COLOR SORTER ASSEMBLY AND METHOD

BACKGROUND AND SUMMARY OF THE INVENTION

The sorting of articles by a wide variety of different properties, while transporting the articles, is becoming ever increasingly desirable, especially for supplying produce to grocery stores and supermarkets. Increasingly popular are color sorting systems for apples and like pieces of fruit, such as shown in WO 91/04803. However, as recognized as desirable by that reference, and as still not achieved by the art, is the ability to see the entire apple or other piece of fruit as it is being transported, and not to see significantly less than the whole apple, or see parts of the apple twice.

When an apple is being conveyed into association with color sensing equipment, such as a color camera, the apple must be rotated in an attempt to allow the camera to see the entire apple. However, depending upon the size of the apple, the rotation that is provided by conventional rollers on support elements is less than desirable. Existing equipment can rotate smaller apples carried thereby much more than 360° so that some parts of the apple are seen twice by the camera, while larger apples are rotated much less than 360°, so that not all of the apple is seen. This can result in a false impression of what the true average color of the apple is, resulting in mis-sorting of applies.

Another problem that can contribute to imprecise rotation of the apples in association with the color sensing equipment is a less than precise drive for rotating the apples when in operative association with the color sensing equipment. For example, such as shown in U.S. Pat. Nos. 5,101,982 and 5,267,654, the rollers carrying the apples may be rotated by a wheel or an extension of a shaft supporting the rollers, by engaging the flat surface. Depending upon contaminant buildup, frictional forces, or other factors, this rotation may not be precise.

According to the present invention an assembly and method are provided which allow the precise rotation of apples, or like articles to be sorted, regardless of the size (within reason) of the apples being sorted. By providing precise rotation of the apples, especially in association with color sensing equipment, it is possible to insure that the color sensing equipment sees all of the apple, within plus or minus 15° or less (typically 5° or less), so that a true picture is given of the apple and it may be accurately sorted. This desirable result is accomplished in two ways. One way is by using particularly tapered cones rather than rollers for supporting the fruit or other articles being transported, and secondly by providing a gear attached to each shaft supporting the cones, which cooperates with a stationary rack.

The invention also deals with another problem that can occur in the prior art when using rollers, such as in U.S. Pat. Nos. 5,101,982 and 5,267,654, as well as in WO 91/04803. In systems such as shown in these references there may be a tendency for an apple, or other article, to move from one set of rollers to the next, which has a significant adverse impact on the proper transport and sorting of the articles. The invention also essentially solves that problem by a bumper at the leading and trailing portions of each support element supporting two sets of cones.

The invention is also advantageous since it can utilize pre-existing sorting mechanisms and support elements, so that a minimum amount of re-tooling, and/or additional manufacturing procedures, are necessary to construct the assembly according to the invention. Particularly, the assembly according to the present invention may be made merely by modifying the support elements shown in U.S. Pat. No. 5,183,151 (the disclosure of which is hereby incorporated by reference herein).

The invention is further advantageous in providing a substantially constant degree of rotation of an article being sorted per revolution of the supporting elements (cones). According to the invention articles (e.g. pieces of fruit, such as apples) having a diameter of about 2 ¼–3½ inches are rotated approximately 120° for each 360° rotation of the input shaft.

According to one aspect of the present invention an article transporting assembly is provided comprising the following components: A support element mounted for movement in a first direction. Two sets of cones mounted to the support element by rotatable shafts, each set comprising first and second cones having a tapered exterior surface, the cones on each shaft facing each other and tapering to an imaginary substantially common midpoint. And the cones for supporting an article essentially without the article touching the shafts, and for rotating the article upon rotation of the shafts. Each of the cones preferably has a first angle of taper of between about 25–35°(e.g. about 28°). The cones may be made of a soft, yieldable material, such as a soft plastic, so that the fruit is not bruised when carried thereby, but yet the cones have sufficient rigidity and structural integrity so as to properly support the articles during transport and rotation.

Typically, the support element is mounted for movement by a conveyor chain, the conveyor chain connected to a plurality of other like support elements in an endless assembly. Typically a bumper is provided at each of the leading and trailing portions of each support element in the first direction, to substantially prevent an article supported by the cones from moving from one support element to the next. Each cone has a portion distal from the cone of the shaft, and the distal portion may have a second angle of taper which is greater than the first angle of taper by at least about 5°, so that a large article may be supported substantially only by the distal portions. Any number of such angles may be provided, depending upon the type of fruit or other articles that is expected to be encountered.

The article transporting assembly according to the invention also typically further comprises means for positively rotating the shafts, substantially in unison, as the support element moves in the first direction. The means for positively rotating the shafts may comprise any conventional structure that is capable of performing that function, such as a roller connected to a first end of each of the shafts and a substantially stationary track which engages the rollers so that the rollers rotate with respect to the track. In a preferred embodiment according to the invention, however, the rollers are gears, and the track comprises a rack having teeth which cooperate with the gears. Preferably the rack is of a material that will wear out faster than the gears, so that the rack needs to be replaced more often than the gears since the rack replacement is easy and gear replacement is much more difficult. For example, the gears may be made of Delrin®, or a like wear-resistant plastic, while the rack is made of rubber, or synthetic rubber, so that the rack has one-half or less the effective life as the effective life of the gears, so that the rack wears out at least about twice as fast as the gears. The gears and rack teeth may be dimensioned so that one turn of the gear effects substantially a 120° rotation of an article supported by the cones.

As shown in U.S. Pat. No. 5,183,151, the assembly further comprises means for tilting the support element sideways to pivot about a substantially horizontal axis substantially perpendicular to the first direction, to discharge articles supported by the cones, to sort the articles into groups (by weight or color, but preferably considering both weight and color). Preferably the shafts are mounted with vertical lost motion to the support element. The assembly also preferably further comprises color sensing equipment cooperating with the support element for determining the color of articles supported by the cones as the shafts rotate, the color sensing equipment cooperating with the tilting means to effect color sorting of articles transported by the support elements. The assembly may also further comprise weighing means over which the support elements pass; and may further comprise means for tilting the support element sideways to pivot about a substantially horizontal axis substantially perpendicular to the first direction to discharge articles supported by the cones, to sort the articles into groups based upon weight (and typically also color) sensed by the weighing means.

According to another aspect of the present invention an article transporting assembly is provided comprising: A support element mounted for movement in a first direction. Two sets of cones mounted to the support by rotatable shafts. The support element mounted for movement by a conveyor chain, the conveyor chain connected to a plurality of other the support elements in an endless assembly. An enlarged gear mounted on a first end of each shaft. And a substantially stationary rack having teeth engaging the gears and cooperating with the gears to effect rotation of the shafts as the support element is moved in the first direction. The details of the gears and rack teeth, and the utilization of appropriate tilting means and color sensing equipment, and the like, preferably are as provided above.

According to another aspect of the present invention a method of transporting pieces of fruit (such as apples) using a support element as described above is provided. The method comprises: (a) Feeding pieces of fruit into contact with the cones while moving the support element in a first direction. (b) Supporting a piece of fruit on the cones, essentially not supported by the shaft, while the support element moves in the first direction. And (c) substantially positively preventing a piece of fruit mounted on the cones from moving onto another support element in series with the support element.

The method may further comprise: (d) passing the support element into operative association with color sensing equipment; (e) rotating the piece of fruit a precisely determined amount by rotating the shafts mounting the cones, while the fruit is in operative association with the color sensing equipment; and (f) sorting the fruit depending upon the color (and also perhaps weight) sensed by the color sensing equipment by pivoting the support element about a substantially horizontal axis substantially perpendicular to the first direction at one of several possible locations. Where the fruit has a diameter of between about 2¼–3½ inches, (e) is practiced so as to rotate each piece of fruit substantially 120° for a 360° rotation of the shafts.

It is the primary object of the present invention to provide an effective article transporting assembly, and method of transporting and/or sorting articles such as pieces of fruit, which provides precise rotation of the articles during transport. This and other objects of the invention will become clear from an inspection of the detailed description of the invention, and from the appended claims.

DETAILED DESCRIPTION OF THE DRAWINGS

Figure 1:
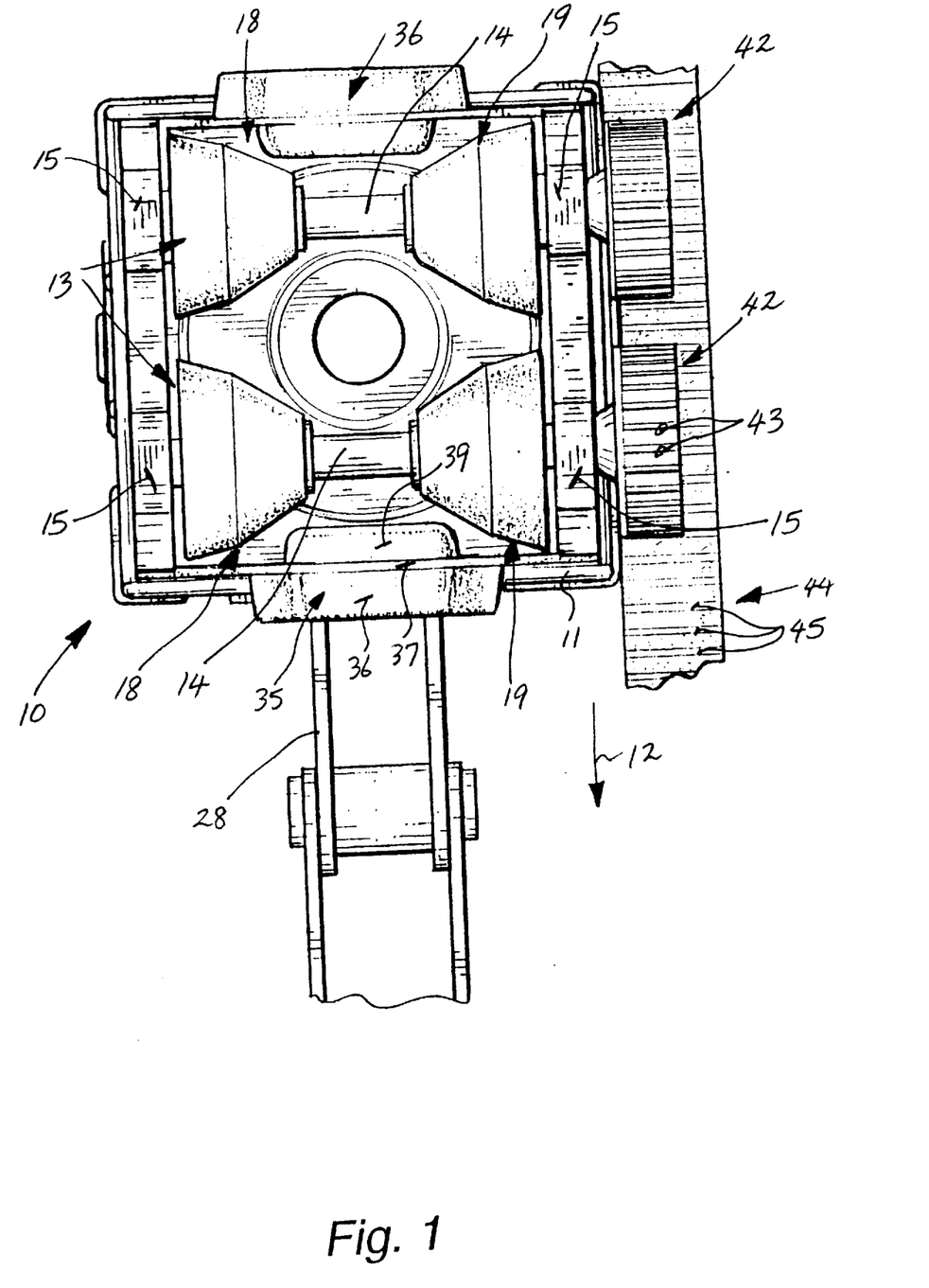
FIG. 1 is a top plan view of an exemplary support element according to the present invention, connected to an endless chain and in association with a stationary rack.
Figure 2:
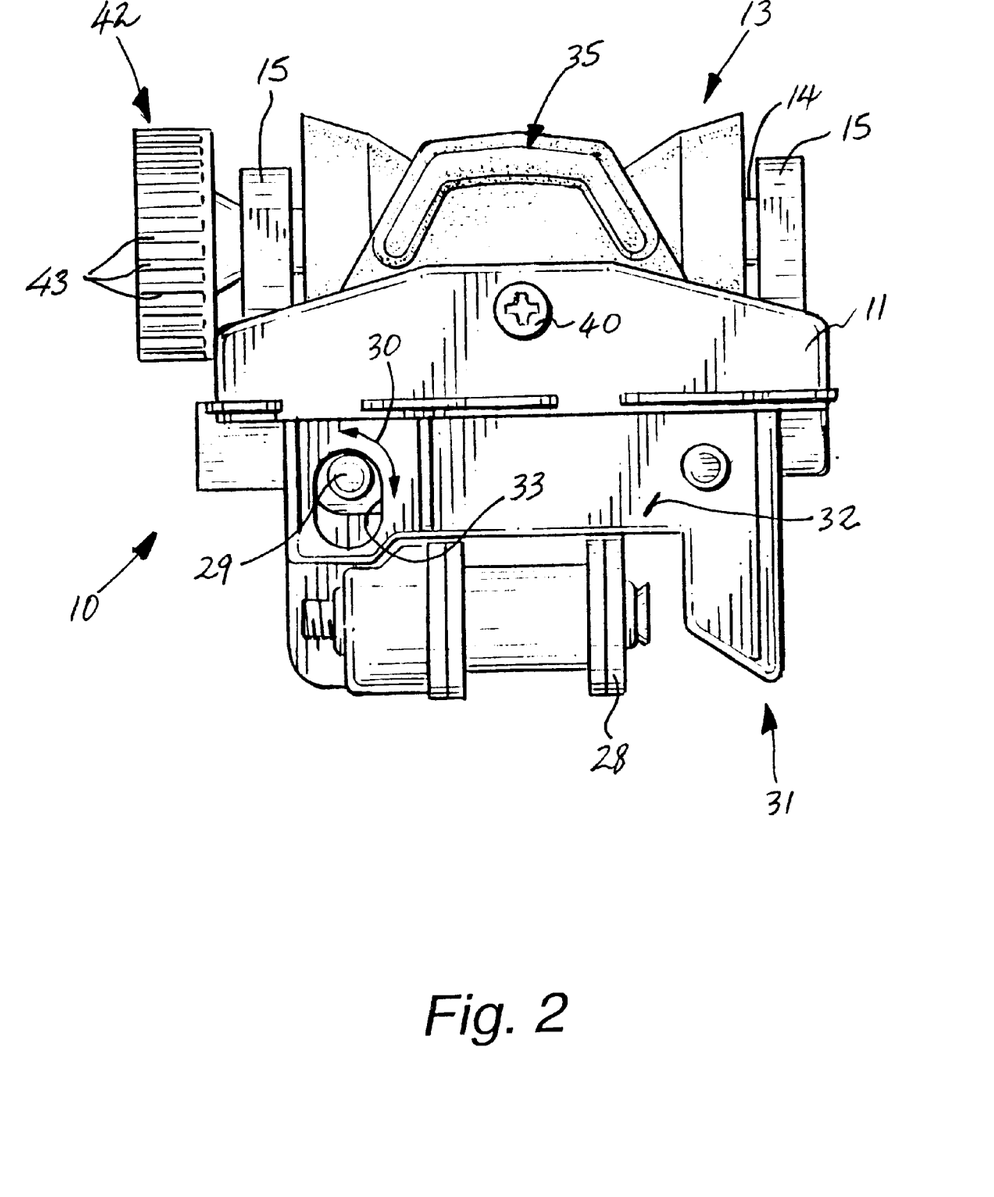
FIG. 2 is a rear end view of the assembly of FIG. 1.
Figure 3:
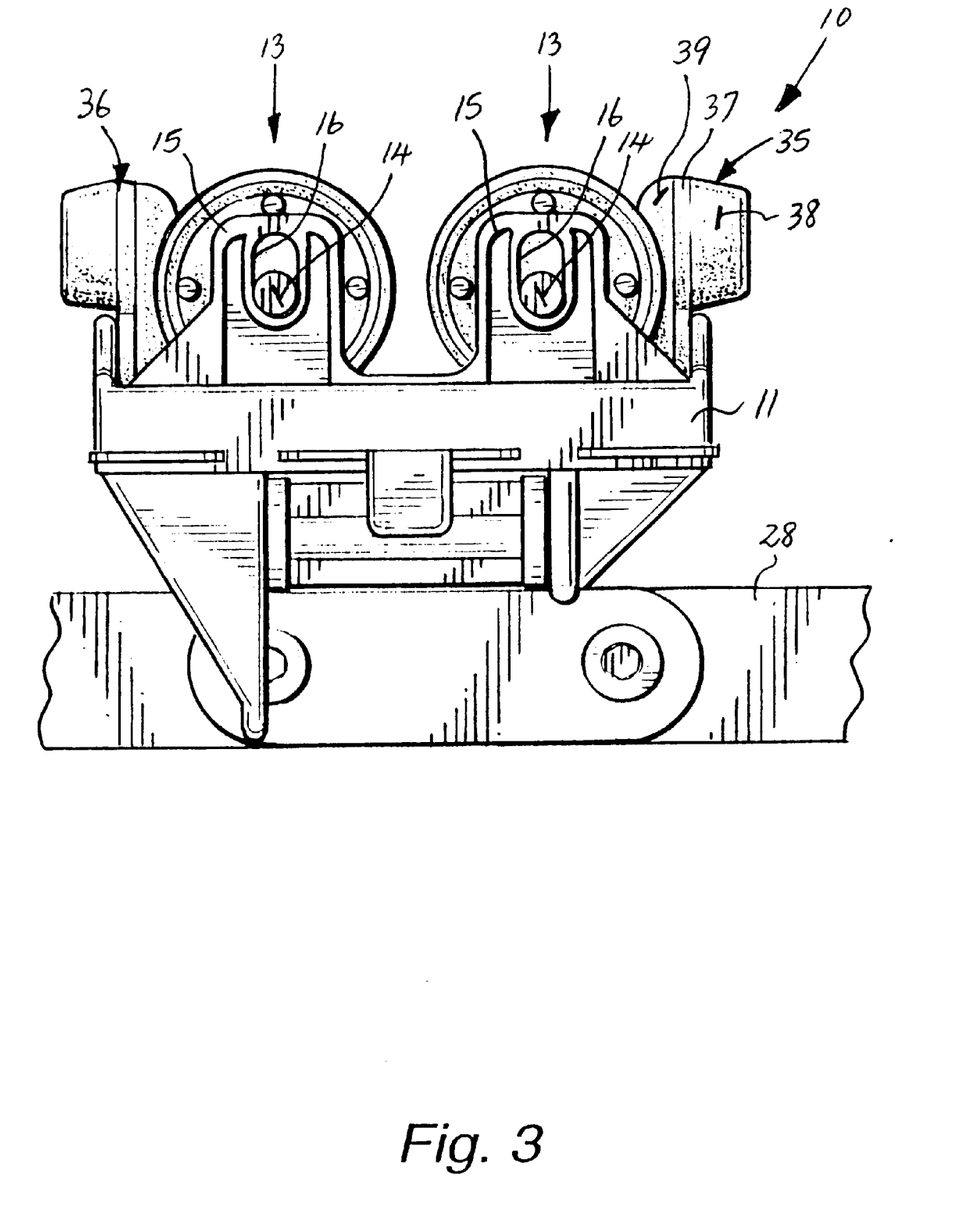
FIG. 3 is a left side view of the assembly of FIG. 1.
Figure 4:
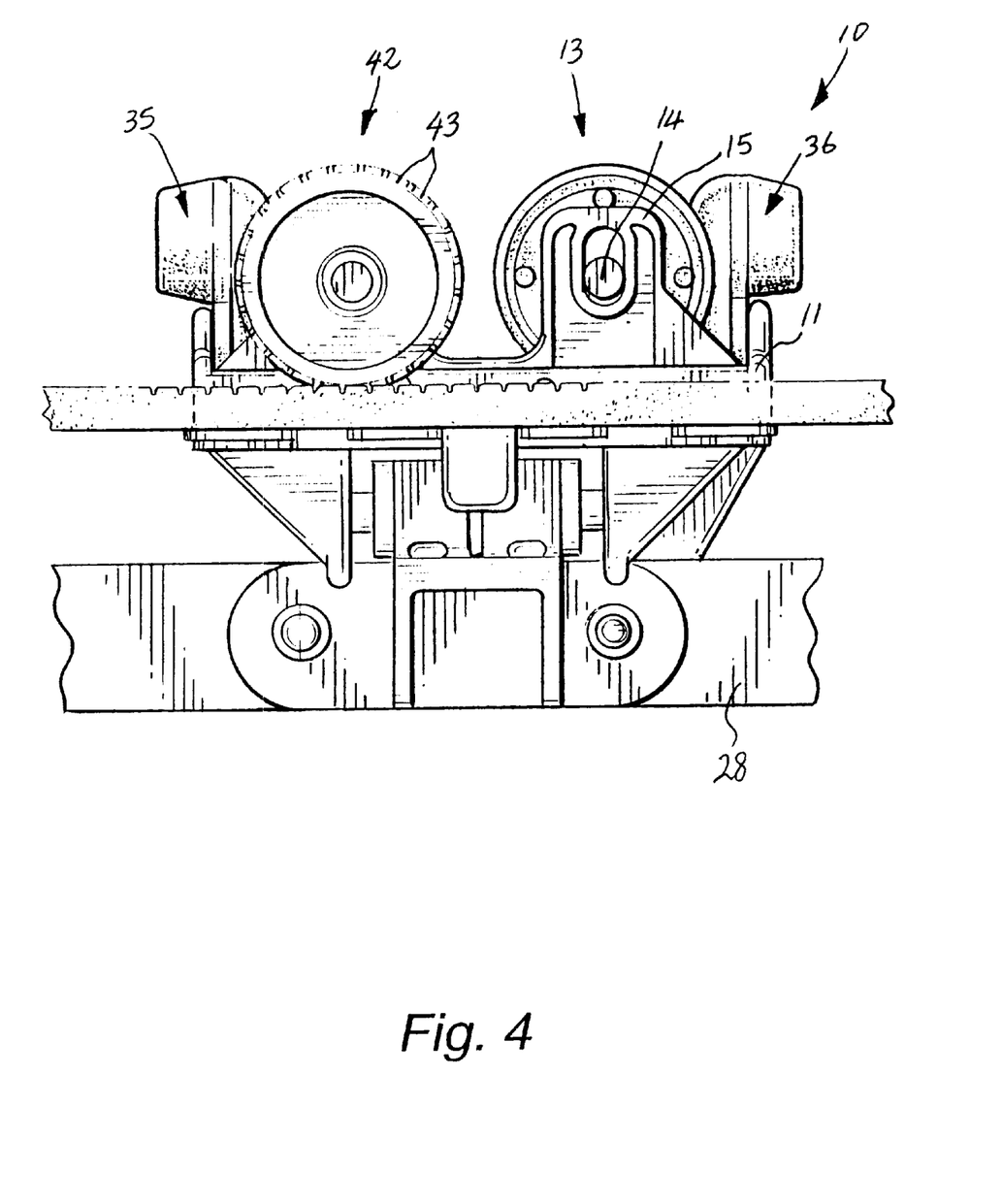
FIG. 4 is a right side view of the assembly of FIG. 1, showing the right-most gear removed for clarity of illustration.

An article transporting assembly according to the present invention is shown generally by reference numeral 10 in FIGS. 1 through 4 and 6. The assembly 10 includes a support element 11 mounted for movement in a first direction 12 (see FIGS. 1 and 6) with two sets of cones, shown schematically at 13, mounted to the support element 11 by rotatable shafts 14. The shafts 14 may be mounted to the support element 11, for example, by the upstanding elements 15 provided along both sides of the support element 11, and as clearly seen in all of FIGS. 1 through 4. As seen in FIGS. 3 and 4, each of the upstanding elements 15 preferably has a vertically elongated slot 16 therein. The slot 16 has a horizontal dimension that is only slightly greater than the diameter of the shaft 14 to allow rotation of the shaft 14 with respect thereto, but has a vertical dimension that is significantly greater than the diameter of the shaft 14 (e.g. about twice as great) to allow vertical lost motion. Also, both the top and bottom ends of the slots 16 are rounded with approximately the same degree of curvature as the shaft 14, as illustrated in FIGS. 3 and 4.

Other suitable mounting mechanisms may be provided aside from the elements 15 with the slots 16, however. The elements 15 may be molded integrally with, or attached to, the support element 11. Preferably the support element 11 is substantially as seen in U.S. Pat. No. 5,183,151 (that disclosure of which is hereby incorporated by reference herein) except that there is no need for a softer material coating because the articles of fruit will be supported by the sets of cones 13.

Figure 5:
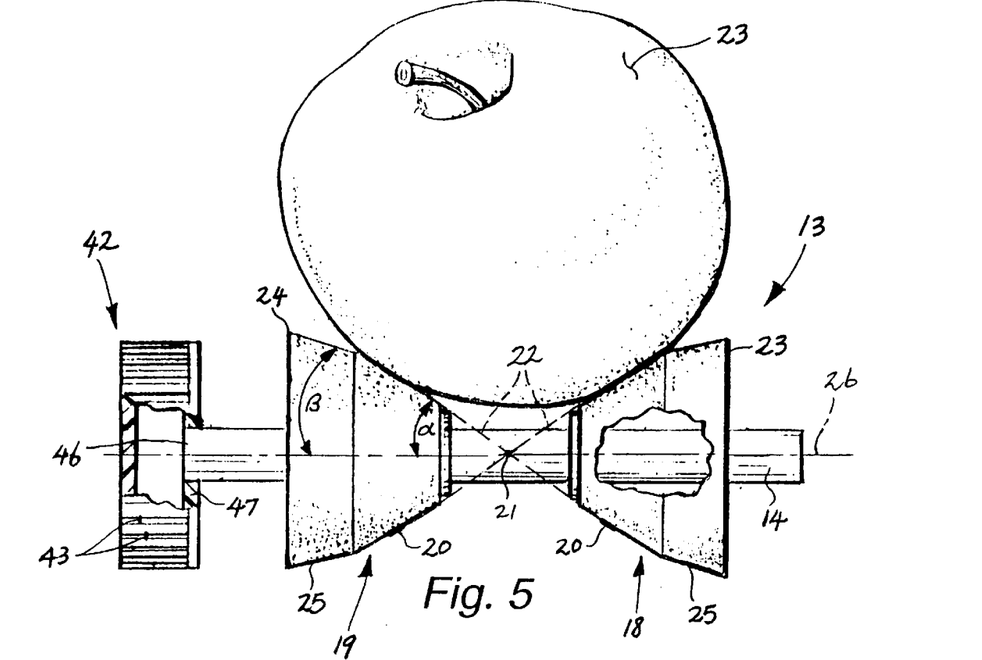
FIG. 5 is a schematic illustration of one of the shafts and cones of the assembly of FIGS. 1 through 4 shown supporting an apple for transport, and also showing the relationship between the cones.

Each set of cones 13 comprises a first cone 18 and a second cone 19. As seen most clearly in the illustration in FIG. 5, each of the cones 18, 19 has a tapered exterior surface 20, and the cones 18,19 face each other (as seen in FIG. 5) and taper to an imaginary (or real) substantially common midpoint 21, as indicated by the imaginary lines 22 in FIG. 5. The cones 18, 19 are constructed to support an article to be transported (and for sorting), such as the apple 23 illustrated in FIG. 5. Because of the relationship of the surfaces 20 of the cones 18, 19, the article 23 is supported by the cones 18, 19 essentially without the article 23 touching the shaft 14, and so that rotation of the shafts 14 effects rotation of the cones 18,19, and also rotation of the article 23.

The tapered surfaces 20 of the cones 18, 19 (shown as truncated cones in FIG. 5) have an angle of taper α. This angle α is preferably between about 25–35°, ideally—for sorting apples—about 28°. However, the angle of taper α instead of being constant, as illustrated in the drawings, may be formed by a plurality of steps each differing in angle from the other by about 1–2°, and such small steps are within the scope of the term "tapered exterior surface" for the surface 20 according to the invention. However, for some circumstances, it is desirable to provide a second (or even a third, fourth, or more) larger transition in the degree of taper of the cones 18, 19, to support larger articles 23 more effectively. That is illustrated in FIG. 5 by the distal portions 23, 24 of the cones 18, 19, respectively (the portions 23, 24 distal from the substantially common midpoint 21). The distal portions 23, 24 have their own tapered exterior surfaces 25 which make an angle β with respect to the axis of rotation 26 of the shaft 14, the angle β being at least about 5° greater than the angle α. For example, where the angle α is about 28°, the angle β may be about 38°. Larger articles 23 would thus be supported substantially exclusively by the surfaces 25.

While the cones 18, 19 may be made of any suitable material, preferably they are of a soft, yieldable material such as EVA, synthetic rubber, or the like. The material of the cones 18, 19 is such that it will be gentle, and have give, when handling bruisable articles such as the apple 23, but yet will have sufficient rigidity so as to positively support the articles 23 for effective transport and rotation, without deflecting too much. In order to save costs and provide maximum gentle handling of bruisable articles such as the apple 23, the cones 18, 19 may be hollow, as seen by the cutaway portion for the cone 18 in FIG. 5, and as also may be seen somewhat in FIGS. 3 and 4.

For effective use of the assembly 10, it is mounted for movement to a conveyor chain 28 (see FIGS. 1 through 4 and 6) of conventional construction, the conveyor chain 28 connected to a plurality of other support elements 11 in the same manner, in an endless assembly, as illustrated and described for the cups in U.S. Pat. No. 5,183,151.

The assembly 10 also preferably further comprises means for tilting the support elements 11 sideways to pivot about a substantially horizontal axis—see pivot point 29, and pivot arrows 30 in FIG. 2—substantially perpendicular to the first direction 12 to discharge articles 23 supported by the cones 18, 19, to sort the articles into groups. The means for tilting the support elements 11 is shown schematically at 31 in FIG. 2, and may be of any conventional construction, such as shown in U.S. Pat. No. 5,101,982 or 5,267,654, the tilting means shown U.S. Pat. No. 5,183,151 being preferred (and the disclosure thereof incorporated by reference herein). This includes lost motion between the pivot pin 29 and the tilting structure 32 mounted to the bottom of the support element 11, as indicated by the elongated slot 33 in FIG. 2.

In order to substantially prevent articles 23 from moving from one assembly 10 to another during conveyance, preferably the bumpers 35, 36 are provided, the bumper 35 provided at the leading portion of the support element 11, and the bumper 36 at the trailing portion of the support element 11, in the first direction 12. While the bumpers 35, 36 may have any suitable construction, preferably they extend almost the same height as the maximum height of the cones 18, 19, and have a soft material which would actually engage the articles 23, which is particularly important when bruisable articles are being transported thereby. For example, as it will be seen with respect to the bumper 35 in FIGS. 1 through 3, the bumper may have a hard plastic or metal core 37 covered on both sides with a soft material 38, 39 such as EVA. The portion 39 is positioned to substantially immediately engage an article 23 if it moves past the axis of rotation 26 of the shaft 14 of the leading set of cones 13, while the bumper portion 38 will gently engage and/or cam any article 23 that inadvertently does get between assemblies 10. The core 37 may be releasably mounted to an upstanding portion of the support element 11, as indicated by the screw 40 in FIG. 2.

The assembly 10 further comprises means for positively rotating the shafts 14 substantially in unison as the support element 11 moves in the first direction 12, at least during a portion of the movement of the assembly 10. While any suitable conventional structure that can accomplish this function may be utilized, typically positive rotation means comprises a rotatable element connected to a first end of each of the shafts 14, and a substantially stationary track which engages the rotatable elements so that the rotatable elements rotate with respect to the track. In the preferred embodiment according to the invention, in order to ensure precise rotation, the rotatable elements are enlarged gears 42 having teeth 43, and the track comprises a rack 44 (see FIG. 1) having teeth 45 which cooperate with the teeth 43 of the gears 42.

In the preferred embodiment of the invention the gears 42 are provided only on one end of each of the shafts 14, externally of the support element 11, but under some circumstances may be provided at both ends of a shaft 14, and depending upon the exact construction of the support element 11 may even be within its "footprint". The gears 42 are attached to the shafts 14 in a manner such that rotation of the gears 42 effects exactly the same rotation of the shafts 14. Any suitable arrangement may be provided for this, such as by providing a tight friction fit between the end 46 of the shaft 14 in a disk-shaped end portion 47 of the gear 42, as schematically illustrated in FIG. 5; or sonic welding, adhesive, or like attachment may be provided between the components 46, 47.

In the preferred embodiment of the present invention, the gears 42 are made of a hard wear-resistant material, while the rack 44, teeth 45 are made of a much less wear-resistant material, so that the rack 44 is replaced before the gears 42. Such an arrangement is provided since it is much more difficult to replace all of the gears 42 in a piece of equipment than it is to replace a single rack 44. For example, the gears 42 may be made of Delrin® or UHMW, while at least the teeth 45 of the rack 44 are made of a hard rubber, or synthetic rubber, with half the life, or less, of the gears 42.

While the pitch of the teeth 45, and the number of teeth 43, may vary depending upon the exact results desired, in a preferred embodiment according to the invention thirty-six teeth 43 are provided, while the rack 44 teeth 45 have a pitch of about 1.2. This means that one 360° turn (rotation) of the shaft 14 results in a rotation of substantially 1200 of an article 23 supported by the cone sets 13 if the article 23 has a diameter [while fruit is not exactly circular in cross section, it has an approximate diameter, and its size is commonly referenced by diameter] of about 2¼–3½ inches. That is, there is a substantially constant degree of rotation of an article 23 per 360° revolution of the cones 18, 19.

By using the particular cones 18, 19, with the relationship illustrated in FIG. 5 and described above, and also with a contribution from the gears 42 and rack 44, according to the present invention it is possible to insure rotation of any (within reason) particular article 23 that is carried by the assembly 10 in a precise manner, that is typically within plus or minus 15°, and in fact within about plus or minus 5°. Plus or minus 5° is about the same margin of error as camera noise, and therefore optimum.

Figure 6:
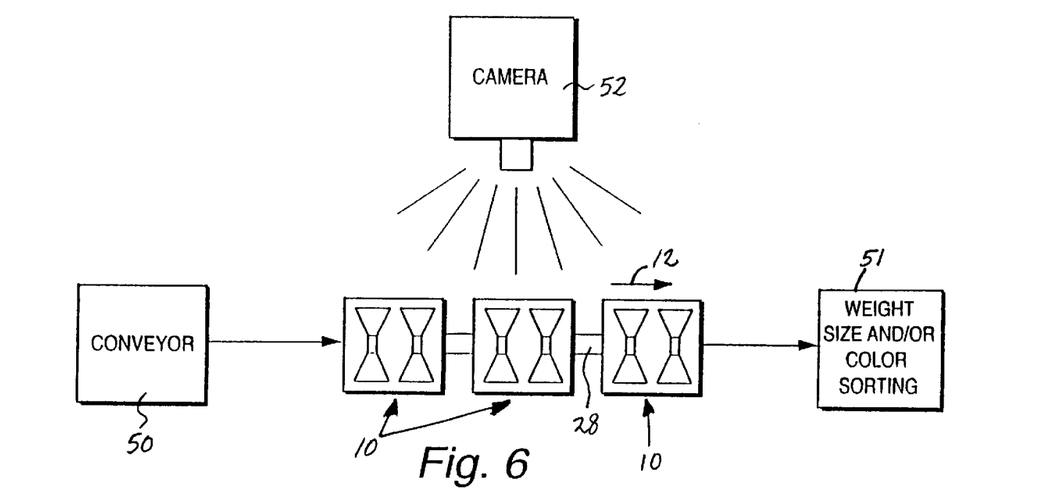
FIG. 6 is a schematic illustration showing the utilization of the assembly of FIGS. 1 through 5 with color sensing equipment, and weight size and/or color sorting equipment.

As seen schematically in FIG. 6, the assemblies 10 according to the present invention are typically associated with a conventional conveyor 50, and may be associated with a conventional weight sizer shown schematically at 51 in FIG. 6, which has conventional weighing means (e.g. an electronic scale) over which the support elements 11 pass, with means for tilting the support elements 11 sideways (see arrows 30 in FIG. 2) to discharge articles to be sorted into groups based upon weight sensed by the weighing means. This is conventional per se and is shown, for example, in U.S. Pat. No. 5,183,151.

The assemblies 10 according to the present invention, however, are primarily designed to be used in association with color sensing equipment and typically weight sensing equipment, such as a conventional color camera 52 illustrated schematically in FIG. 6, and as described with respect to WO 91/04803 reference. When the apples 23, or like articles, supported by the assemblies 10 go into the field of view of the camera 52 the color thereof is sensed. In the preferred embodiment of the invention in the time that any particular article 23 supported by a particular assembly 10 is in the field of view of the camera 52 the shafts 14 will complete three revolutions, which will result in one complete revolution (plus or minus about 5°) of the apple 23, so that the color camera 52 will be able to sense the color of substantially all portions of the apple 23, but not any significant portion thereof more than once. This will allow accurate sorting by color as by using the conventional sorting equipment illustrated schematically at 51 in FIG. 6.

According to the present invention, a method of transporting pieces of fruit 23 is also provided. In the practice of the method pieces of fruit are fed into contact with the cones 18, 19 (both cone sets 13 of an assembly 10) while the support 11 is moved in the first direction 12. This feeding may be accomplished in any suitable manner, such as by utilizing a singulator as disclosed in U.S. Pat. No. 5,183,151, or using any other conventional mechanism for feeding pieces of fruit to support elements carried by a chain or the like.

After being fed to the assemblies 10, the pieces of fruit 23 are supported by the cones 18, 19 of the sets 13, and essentially not supported by the shafts 14, while the support element 11 continues to move in the first direction 12. Also, a piece of fruit 23 is substantially positively prevented by the bumpers 35, 36 from moving onto another support element 12 in series with the support element 11. In the preferred embodiment the support element 11 is passed into operative association with the color sensing equipment, such as camera 52 (see FIG. 6), and the piece of fruit 23 is rotated a precisely determined amount (typically about 360°, plus or minus 15°, preferably plus or minus about 5°) by rotating (by cooperation between gears 42 and teeth 45) the shafts 14, while the fruit 23 is in operative association with the camera 52. Then the fruit is sorted depending upon the color sensed by the camera 52 by pivoting the support element 11 about a substantially horizontally axis substantially perpendicular to the first direction 12 (as indicated by the arrows 30 in FIG. 2 and as described in U.S. Pat. No. 5,183,151) at one of several possible locations (e.g. at stations where different color ranges and/or weights are included).

It will thus be seen that according to the present invention a highly advantageous article transporting assembly, and method of transporting and/or sorting articles, such as pieces of fruit (like apples), are provided, which particularly allow accurate rotation of a piece of fruit in association with color sensing equipment, with a degree of accuracy not achievable in the prior art. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. An article transporting assembly comprising:
    a support element mounted for movement in a first direction;
    two sets of cones mounted to said support element by rotatable shafts, each set comprising first and second cones having a tapered exterior surface, said cones on each shaft facing each other and tapering to an imaginary substantially common midpoint; and
    said cones for supporting an article essentially without the article touching said shafts, and for rotating the article upon rotation of said shafts.

2. An article transporting assembly as recited in claim 1 wherein each of said cones has a first angle of taper of between about 25–35°.

3. An article transporting assembly as recited in claim 2 wherein said cones are made of soft, yieldable material.

4. An article transporting assembly as recited in claim 2 wherein said support element is mounted for movement by a conveyor chain, said conveyor chain connected to a plurality of other said support elements in an endless assembly.

5. An article transporting assembly as recited in claim 4 further comprising a bumper at the leading and trailing portions of said support elements in said first direction to substantially prevent an article supported by said cones from moving from one support element to the next.

6. An article transporting assembly as recited in claim 2 wherein each cone has a portion distal from the other cone of said shaft, each said distal portion having a second angle of taper which is greater than said first angle of taper by at least about 5°, so that a large article may be supported substantially only by said distal portions.

7. An article transporting assembly as recited in claim 1 further comprising means for positively rotating said shafts, substantially in unison, as said support element moves in said first direction.

8. An article transporting assembly as recited in claim 7 wherein said positively rotating means comprises a rotatable element connected to or part of a first end of each of said shafts, and a substantially stationary track which engages said rotatable elements so that said rotatable elements rotate with respect to said track; and wherein said rotatable elements are gears larger than said shafts, and wherein said track comprises a rack having teeth which cooperate with said gears.

9. An article transporting assembly as recited in claim 8 wherein said gears and rack teeth are dimensioned so that one 360° revolution of said gear effects substantially a 120° rotation of an article supported by said cones.

10. An article transporting assembly as recited in claim 8 wherein said rack is of a material having one-half or less the effective life as the effective life of said gears so that said rack wears out at least about twice as fast as said gears.

11. An article transporting assembly as recited in claim 1 wherein an article having a diameter between about 2¼–3½ inches is rotated substantially 120° for each 360° revolution of said shafts.

12. An article transporting assembly as recited in claim 4 wherein said shafts are mounted with vertical lost motion; and further comprising means for tilting said support element sideways to pivot about a substantially horizontal axis substantially perpendicular to said first direction to discharge articles supported by said cones, to sort the articles into groups.

13. An article transporting assembly as recited in claim 12 further comprising color sensing equipment cooperating with said support element for determining color of articles supported by said cones as said shafts rotate, said color sensing equipment cooperating with said tilting means to effect color sorting of articles transported by said support elements.

14. An article transporting assembly as recited in claim 4 wherein said shafts are mounted with vertical lost motion; and further comprising weighing means over which said support elements pass; further comprising means for tilting said support element sideways to pivot about a substantially horizontal axis substantially perpendicular to said first direction to discharge articles supported by said cones, to sort the articles into groups based upon weight sensed by said weighing means.

15. An article transporting assembly comprising:
   a support element mounted for movement in a first direction;
   two sets of cones mounted to said support by rotatable shafts;
   said support element mounted for movement by a conveyor chain, said conveyor chain connected to a plurality of other said support elements in an endless assembly;
   an enlarged gear mounted on a first end of each shaft; and
   a substantially stationary rack having teeth engaging said gears and cooperating with said gears to effect rotation of said shafts as said support element is moved in said first direction.

16. An article transporting assembly as recited in claim 15 wherein said rack is of a material having one-half less life than the life of said gears so that said track wears out at least twice as fast as said gears.

17. An article transporting assembly as recited in claim 15 wherein said gears and rack teeth are dimensioned so that one turn of said gear effects substantially a 120° turn of an article supported by said cones; and further comprising: means for tilting said support element sideways to pivot about a substantially horizontal axis substantially perpendicular to said first direction to discharge articles supported by said cones, to sort the articles into groups; and color sensing equipment cooperating with said support element for determining color of articles supported by said cones as said shafts rotate, said color sensing equipment cooperating with said tilting means to effect color sorting of articles transported by said support elements.

18. A method of transporting pieces of fruit using a support element having two sets of cones mounted to the support element by rotatable shafts, each set comprising first and second cones having a tapered exterior surface, the cones on each shaft facing each other and tapering to an imaginary substantially common midpoint; said method comprising:
   (a) feeding pieces of fruit into contact with the cones while moving the support element in a first direction;
   (b) supporting a piece of fruit on the cones, essentially not supported by the shaft, while the support element moves in the first direction; and
   (c) substantially positively preventing a piece of fruit mounted on the cones from moving onto another support element in series with the support element.

19. A method as recited in claim 18 further comprising: (d) passing the support element into operative association with color sensing equipment; and (e) rotating the piece of fruit a precisely determined amount by rotating the shafts mounting the cones, while the fruit is in operative association with the color sensing equipment.

20. A method as recited in claim 19 further comprising: (f) sorting the fruit depending upon the color sensed by the color sensing equipment by pivoting the support element about a substantially horizontal axis substantially perpendicular to the first direction at one of several possible locations.

21. A method as recited in claim 19 wherein the pieces of fruit have a diameter between about 2¼–3½ inches, and wherein (e) is practiced by rotating each piece of fruit substantially 120° for each 360° revolution of the shafts.

* * * * *